United States Patent [19]

Snitgen

[11] 4,439,986

[45] Apr. 3, 1984

[54] HYDRAULIC POWR UNIT

[76] Inventor: Joseph D. Snitgen, 18828 Hillcrest, Birmingham, Mich. 48009

[21] Appl. No.: 228,156

[22] Filed: Jan. 23, 1981

[51] Int. Cl.[3] .............................................. B60T 13/00

[52] U.S. Cl. ...................................... 60/547.1; 60/560; 60/567; 60/591

[58] Field of Search ..................... 60/547 R, 560, 567, 60/571, 576, 579, 581, 593, 563, 564, 573, 574, 591

[56] References Cited

U.S. PATENT DOCUMENTS

| | | | |
|---|---|---|---|
| 2,032,185 | 2/1936 | Sciaky | 60/567 |
| 2,240,287 | 4/1941 | Croll, Jr. | 60/581 |
| 2,759,330 | 8/1956 | van Broekhoven | 60/560 |
| 3,001,369 | 9/1961 | Allais | 60/581 |
| 3,257,810 | 6/1966 | Hanni | 60/547 |
| 3,407,601 | 10/1968 | Beck | 60/567 |
| 3,513,656 | 5/1970 | Engle | 60/574 |
| 3,643,725 | 2/1972 | Fismer | 60/547 |
| 3,942,323 | 3/1976 | Maillet | 60/560 |
| 4,144,904 | 3/1969 | Dits | 60/581 |
| 4,170,876 | 10/1979 | Dits et al. | 60/567 |
| 4,187,762 | 2/1980 | Buzby | 60/581 |
| 4,241,581 | 12/1980 | Chace | 60/567 |
| 4,351,153 | 9/1982 | Kosmala | 60/581 |

FOREIGN PATENT DOCUMENTS

| | | | |
|---|---|---|---|
| 2538870 | 4/1976 | Fed. Rep. of Germany | 60/547 R |
| 44-19054 | 8/1969 | Japan | 60/567 |
| 939951 | 10/1963 | United Kingdom | 60/571 |

*Primary Examiner*—Abraham Hershkovitz

*Attorney, Agent, or Firm*—Harness, Dickey & Pierce

[57] ABSTRACT

There is disclosed an air operated demand only hydraulic power unit for supplying hydraulic fluid under presure to one or more hydraulic working motors, comprising an extensible pneumatic power motor including an extensible power transmitting member, an extensible hydraulic slave motor including an extensible slave member powered by said power transmitting member, said slave motor being connected to each said hydraulic working motor to power same, valving for controlling the supply of air and oil to said power and slave motors, and a reset valve for insuring full volume cycling of said slave member in said slave motor. In one embodiment the reset is indicated by sensing the various pressure changes after all working motors are extended and then valving leftover oil to a reservoir. A second embodiment accomplishes the reset on a time delay basis. There is also disclosed an optional intensifier for two-stage operation of said working motors and an optional intensifier for the retract stroke of said power unit to insure full retraction of the hydraulic working motors if so desired. Further included in the disclosure is a mechanism for readily and selectively limiting the working volume of the extensible pneumatic power motors as desired in relation to the number of working motors utilized.

10 Claims, 7 Drawing Figures

HYDRAULIC POWR UNIT

BACKGROUND AND SUMMARY OF THE INVENTION

The present invention relates to hydraulic power supplies, and more particularly to air operated volumetric hydraulic power units ideally suited for powering high production multiple head welding machines and like equipment.

Machines using fluid motors (e.g., piston and cylinder assemblies) to drive working pistons for clamping tools, actuating tools or welding guns, etc. are generally either pneumatically or hydraulically powered. If high speed is required air is often preferred because it is cleaner and will give faster action than oil at the same supply pressure; however, saftey limits on usable pressures result in cylinder sizes which are too large for many applications. Oil can be used at higher pressures, thereby reducing cylinder sizes, but to get fast action relatively large displacement pumps are required. Hydraulic power units therefore tend to be large and costly, and because they have continuously operating pumps (even during the dwell or rest portion of the load cycle, because they must be able to quickly meet any sudden demand) they consume substantial amounts of power (variable displacement pumps may consume only moderate power, but are even more costly) are a source of continuous noise, and generate considerable heat because all excess is dumped back to the reservoir after being raised to working pressure.

It is therefore a primary object of this invention to provide an improved hydraulic power supply which operates on demand only, i.e., it supplies oil under pressure only when required by the load, thereby virtually eliminating the consumption of power (and attendant operating cost), noise and heat build-up when the load is in the dwell or rest part of its cycle (often a substantial proportion of the total cycle time). A related object resides in the provision of unique reset means for insuring full completion of each cycle of the power unit prior to initiation of a new cycle.

Further objects of the present invention concern the provision of a demand type hydraulic power unit which can be easily sized for any volumetric demand, which is relatively compact and economical, which can provide desired high speeds without requiring bulky and costly accumulators, and which can be retrofit to existing machines.

Another object of this invention resides in the provision of a demand type hydraulic power unit which optionally can provide an intensified output for those applications where a two-stage advance stroke is desired, i.e., one in which the hydraulic piston initially advances toward the workpiece at a high rate of speed but with relatively little force, and upon engagement with the workpiece provides very high force but with limited displacement.

A further object of this invention resides in the provision of an auxiliary hydraulic power unit coupled with the primary power unit which discharges intensified oil during the return pressurized function of the primary power unit to lock up retract oil in the return machine manifold to keep the rod ends of the working pistons from drifting downward when the fluid motor is shut down for a period of time (and pistons are mounted with rod ends down) and also intensify return oil to retract end of working piston (when stuck due to bent rods or the like).

A further advantage of the present invention is that in one embodiment fluid is returned to a hydraulic slave cylinder under pressure (and not through a reservoir) for a faster refill caused by the back pressure of the unit and thereby faster cycling of the unit.

In some instances, fewer hydraulic working pistons may be used and less air is necessary to drive the power unit. In such cases, a significant cost advantage occurs if the working volume of the master cylinders are diminished. It is a further advantage of the present invention to provide a simple and efficient means of reducing the working volume of the master cylinders as desired to attain a cost savings using less pressurized air when fewer working pistons than the maximum number are utilized.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
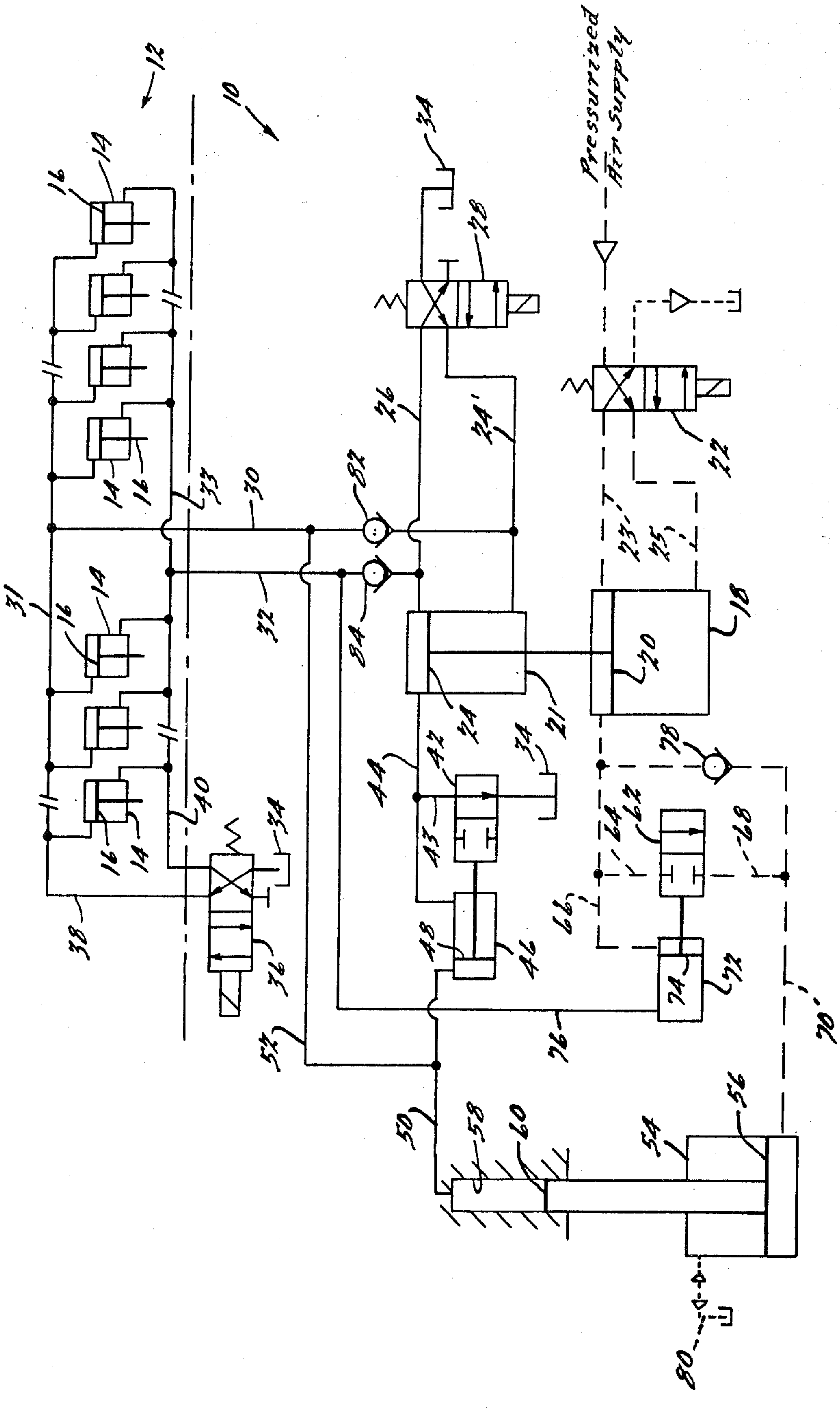
FIG. 1 is a schematic circuit diagram of a first embodiment hydraulic power unit of the present invention. Oil conduits are shown as solid lines and air conduits are shown as broken lines.

Referring to FIG. 1, generally, the embodiment of the present invention disclosed therein comprises a hydraulic power unit 10 and a hydraulically operated machine 12, incorporating a plurality of working cylinders 14 each having a working piston 16 therein, a phantom line separating unit 10 from machine 12 in the drawing. Although machine 12 may be of any type requiring power in the form of a volume of oil under pressure, the present invention is particularly suited for use in power multi-gun welding machines of the type used in the mass production of automobiles, appliances and the like. Each such machine may have dozens of separate guns, each requiring a separate working cylinder. If desired, suitable unions or couplings may be provided between the power unit and the machine.

The power unit of the present invention comprises a pneumatic extensible fluid motor or power cylinder 18 having a piston 20 therein; a solenoid operated air supply valve 22 connected to motor or cylinder 18 by fluid conduits 23 and 25 and normally spring biased to a first position (as shown) to place the head end of piston 20 in fluid communication with a pressurized source of air (e.g., plant air) and the rod end thereof in fluid communication with the atmosphere, and actuatable by the solenoid to a second position to place the head end of piston 20 in fluid communication with the atmosphere and the rod end thereof in fluid communication with the pressurized source of air; and a hydraulic extensible fluid motor or slave cylinder 21 having a piston 24 therein, piston 24 being operatively connected to and powered by piston 20, slave cylinder 21 being connected via fluid conduits 24' and 26 to a solenoid operated oil supply valve 28, via a conduit 30 to a supply or advance oil conduit 31 communicating with the head end of each of the working cylinders, and via a conduit 32 to a return or retract oil conduit 33 communicating with the rod end of each of the working cylinders, whereby movement of piston 24 downwardly (as shown) will cause oil to be pumped out of slave cylinder 21 through conduits 24', 30 and 31 to advance each working piston, and movement upwardly (as shown) will cause oil to flow through conduits 26, 32 and 33 to retract each working piston. The rod end of slave cylinder 21 should have an oil volume substantially greater than the total volume of all the head ends of all the working cylinders (plus the volume of the relevant conduits and actuators) to make sure that there is always sufficient oil to quickly advance the working pistons when desired and to accommodate all leaks (which are unavoidable).

Solenoid operated oil supply valve 28 is normally spring biased to a first position (as shown) to place the rod end of piston 24 in fluid communication with the oil in reservoir 34 and to block fluid communication between the head end thereof and reservoir 34, and is actuatable by the solenoid to a second position to place the head end of piston 24 in fluid communication with the oil in reservoir 34 and to block fluid communication between the rod end thereof and reservoir 34.

Also provided is a solenoid operated oil return valve 36 normally spring biased to a first position (as shown) to place the head end of each working piston in fluid communication with oil reservoir 34 via a fluid conduit 38 and to block fluid communication between the rod ends thereof and said reservoir via a fluid conduit 40, and actuatable by the solenoid to a second position to place the rod end of each working piston in fluid communication with reservoir 34 via conduit 40 and to block fluid communication between the head end thereof and said reservoir.

One of the unique aspects of the present invention resides in the provision of reset means to assure that piston 24 in slave cylinder 21 fully retracts each cycle of the apparatus. The reset means of the present invention comprises a two-position reset valve 42 connected to slave cylinder 21 by fluid conduits 43 and 44, and operable in its first position (as shown) to place the head end of piston 24 in fluid communication with the oil in reservoir 34, preferably below the oil level therein to eliminate any chance of drawing air in on reversal of piston movement, and in its second position to block fluid communication between the head end of piston 24 and the oil in reservoir 34. Reset valve 42 is actuated to one or the other of its two positions by a reset valve actuator comprising a cylinder 46 having a piston 48 therein connected to the reset valve. The head end of piston 48 is in fluid communication with conduit 30 via fluid conduits 50 and 52, and the rod end of piston 48 is in fluid communication with the head end of piston 24 via conduit 44.

In applications where two-stage power is required, i.e., a high speed low force advance stroke followed upon workpiece engagement by a low speed high force working stroke, intensifying means may be provided. The intensifying means of the present invention comprises a relatively large air cylinder 54 having an air piston 56 therein, and a relatively small oil cylinder 58 having a piston 60 therein powered by air cylinder piston 56. Oil cylinder 58 is in fluid communication with conduit 30 via conduits 50 and 52. The intensifying means is controlled by a two-position sensing valve 62 in fluid communication with the rod end of piston 20 by fluid conduits 64 and 66 and with the head end of air piston 56 by fluid conduits 68 and 70, and operable in its first position (as shown) to block communicaiton between cylinder 18 and cylinder 54, and in its second position to place the rod end of piston 20 in fluid communication with the head end of piston 56, to generate relatively high oil pressures in cylinder 58, which is communicated to oil supply conduit 31 and the head ends of the working pistons via conduits 50, 52 and 30. Conduit 70 also functions as a bypass conduit connecting the head of piston 56 with the rod end of piston 20, and has a check valve 78 disposed therein for permitting venting of air cylinder 54 on the return stroke of piston 56. The rod end of piston 56 is permanently vented at 80.

Sensing valve 62 is actuated to one or the other of its two positions by a sensing valve actuator comprising a cylinder 72 having a piston 74 therein connected to the sensing valve, the head end of piston 74 being connected to conduit 32 via a fluid conduit 76 and the rod end thereof being connected to the rod end of piston 20 via conduit 66. If two-stage operation is not required, or extra high forces are not necessary, the intensifier means of the present invention may be omitted.

A check valve 82 is provided in conduit 30 for preventing flow therefrom, or from cylinders 46 or 58 into slave cylinder 21, and a check valve 84 is provided in conduit 32 for preventing flow therefrom or from cylinder 72 into slave cylinder 21.

The power unit of the present invention has an operating cycle which comprises the steps of advance, intensify, retract and reset. As shown in FIG. 1, the system is in its fully retracted and reset condition, with no power supplied to the solenoid valves. In this condition the three solenoid valves are in their normal spring biased position illustrated, the power piston is fully advanced and the slave piston fully retracted, all of the working pistons are fully retracted, and the intensifier piston is fully retracted. For purposes of description, it will be assumed that each of the working pistons is provided with a working element (clamp, welding gun, etc.) which engages a workpiece, and that it is desired to have the working element advance toward the workpiece at a high rate of speed but with relatively little force, and upon engagement with the workpiece provide a very high force but with limited displacement.

In this retracted condition, the head ends of working pistons 16, the head end of reset actuator cylinder 46 and intensifying cylinder 58 are in fluid communication with reservoir 34 via oil return solenoid valve 36, the rod end of slave piston 24 is in fluid communication with reservoir 34 via oil supply solenoid valve 28, the rod end of power piston 20 is in communication with the atmosphere via air supply solenoid valve 22, and the head end of intensifier air piston 56 is in communication with atmosphere by virtue of its connection to cylinder 18 at the rod end of power piston 20, via check valve 78. The system has reached this position and is maintained in this position by the pressure of plant air on the head end of power piston 20 via air supply solenoid valve 22.

When it is desired to actuate the hydraulic machine 12, electric power is supplied to solenoid valves 22, 28 and 36 to actuate them from the first position shown to their second position. This initiates the advance portion of the machine cycle. Air under plant pressure is supplied via air supply valve 22 to the rod end of power piston 20 to cause the latter to move downwardly (as shown). Air is exhausted from the head end of power piston 20 to the atmosphere via air supply valve 22. Downward movement of power piston 20 causes a corresponding movement of slave piston 24, which in turn causes oil to be forced from slave cylinder 21 via conduits 24', 30 and 31 to the head ends of working pistons 16 to cause the working elements thereof to advance towards the workpieces (not shown). The rod ends of working pistons 16 are in fluid communication with the atmosphere via oil return valve 36. The head end of slave piston 24, as well as the rod end of reset valve actuator piston 48, draw oil from the reservoir via oil supply valve 28. This permits slave piston 24 to move downwardly and actuator piston 48 to move to the right (as shown) under the influence of pressure generated in the slave cylinder (via lines 50 and 52) to actuate reset valve 42 to a position in which fluid communication between the head end of slave piston 24 and the reservoir is blocked.

During the advance stroke (which may take less than one second), the back pressure in conduits 33 and 40 is sufficiently high due to flow losses throughout the system that the residual pressure on the head end of sensing valve actuator piston 74 is sufficient to overcome air supply pressure applied to the rod end thereof (the respective areas of the piston can be designed to assure that this is true). When the working elements engage the workpiece and advance motion of the working pistons 16 ceases, the back pressure in conduits 33 and 40 drops and the air pressure in sensing valve actuator cylinder 72 overcomes the hydraulic back pressure and piston 74 moves to the left, thereby actuating sensing valve 62 to place plant air in fluid communication with the head end of intensifying air piston 56. The pressure on this relatively large piston creates relatively high oil pressures in intensifying cylinder 58, which pressures are communicated to the head ends of the working pistons via conduits 50, 52, 30 and 31, whereby high forces are generated between the working elements and workpieces (not shown). This is the intensifying portion of the machine cycle and it occurs after the workpieces have been engaged by the working elements. The rod end of intensifying air piston 56 is vented at 80. The apparatus remains in the intensifying condition until all three solenoid valves are deenergized.

Deenergization of the three solenoid valves initiates the retract portion of the machine cycle, which causes the system to return to the condition illustrated in the drawing. During the retract portion of the cycle, air under pressure is supplied by air supply valve 22 to the head end of power piston 20 to cause it and slave piston 24 to move upwardly (as shown) to generate oil pressure at the head end of slave piston 24 which is in fluid communication with the rod ends of the working pistons, thereby causing them to retract. That same hydraulic pressure causes sensing valve actuator piston 74 to move to the right to reset sensing valve 62.

When the working pistons have fully retracted, the back pressure in conduits 31, 30, 52 and 50 decreases to the point where the pressure communicated to the rod end of reset valve actuating piston 48 moves the latter to the left to place the head end of slave piston 24 in fluid communication with the reservoir. This is the reset portion of the power unit cycle and is absolutely necessary to insure that the slave cylinder fully returns to the position illustrated, so that it can perform a full volume cycle thereafter upon demand. In the absence of reset valve 42 and its actuator, slave piston 24 would fluid lock prior to returning to its fully retracted position by virtue of the fact that less oil is needed to retract the working pistons than is needed to advance them because of the reduced volume in the rod ends of the cylinders as compared to the head ends. Also, leaks are unavoidable and are greater on the advance stroke because of higher oil pressures.

During the retract portion of the cycle the head ends of the working pistons force the oil in the head ends of the working cylinders into the reservoir via oil return valve 36, the rod end of slave piston 24 draws oil into the rod end of cylinder 21 from the reservoir via oil supply valve 28, and the rod end of power piston 20 exhausts to atmosphere via air supply valve 22. The head end of intensifier air piston 56 is in communication with atmosphere via check valve 78 so that the back pressure in conduits 31, 30, 52 and 50 will cause the intensifier piston to return to the position illustrated.

It is believed that a hydraulic power unit incorporating applicant's invention, using a power cylinder having an 8" bore and a 4" stroke and a slave cylinder having a 7" bore, in combination with an intensifier wherein the air piston has a 6" bore and a 3" stroke and the oil cylinder has a $2\frac{1}{4}$" bore, will replace an existing hydraulic power unit requiring a 40 gpm pump, a 30 H.P. electric motor, a 120 gallon reservoir, an air/oil accumulator and a heat exchanger, the latter being required to cool pressurized oil which is not used and therefore must be dumped back into the reservoir. Applicant's power unit may weigh only 250 pounds, compared to 5000 pounds for the state-of-the-art unit, and requires only a 4 gallon reservoir. Standard criteria are used in choosing the strokes and bores of the various cylinders, depending on the volumes, strokes and forces desired.

Figure 2:
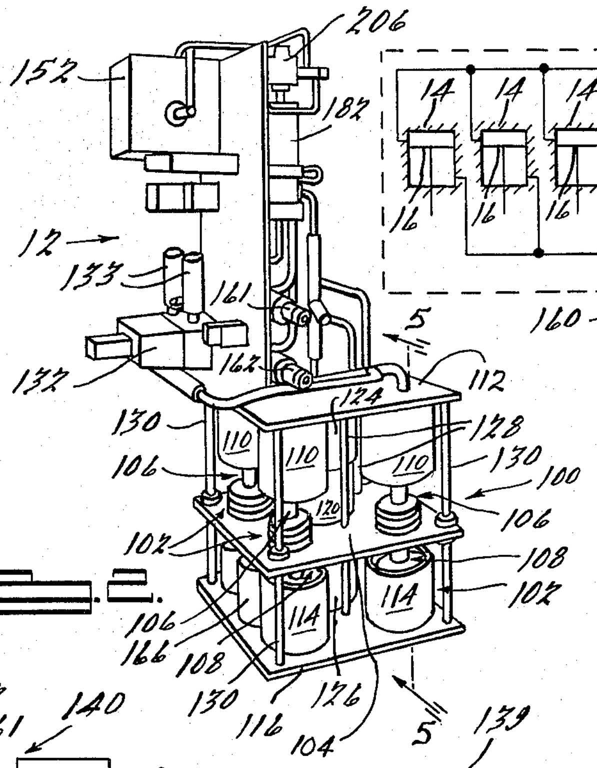
FIG. 2 is an elevated perspective view of an alternative embodiment of a hydraulic power unit of the present invention.
Figure 4:
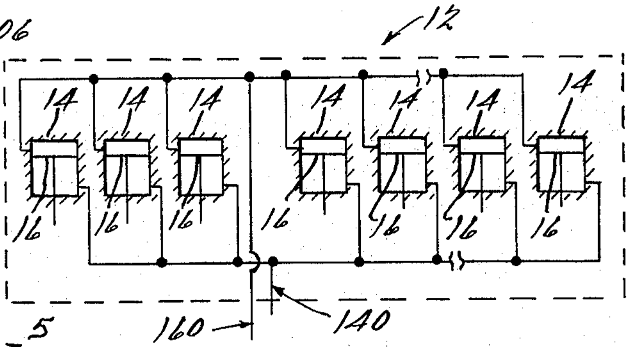
FIG. 4 is a schematic circuit diagram of the working cylinder conduit system of the circuit of FIG. 3.
Figure 3:
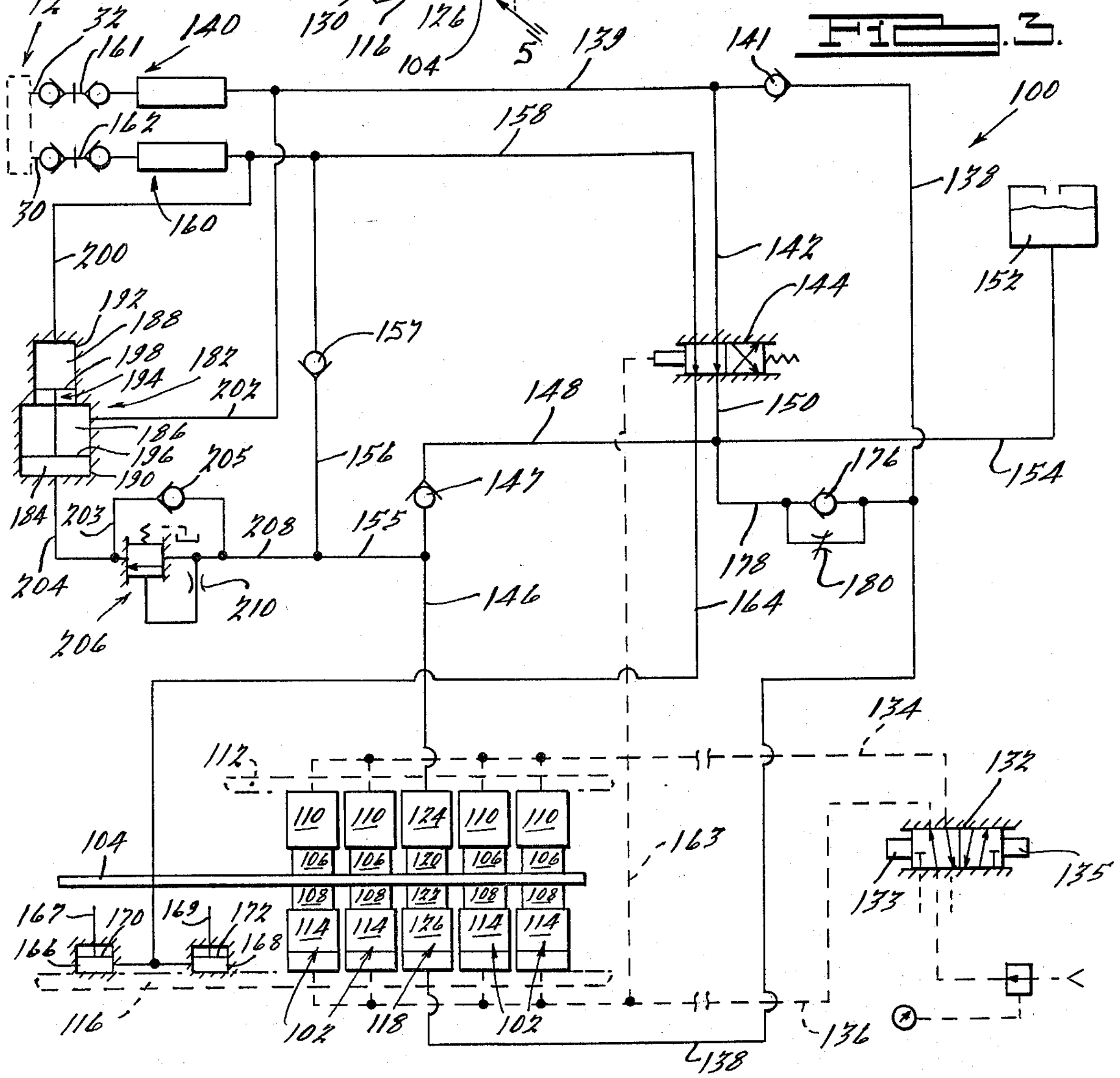
FIG. 3 is a schematic circuit diagram of the unit illustrated by FIG. 2.

An alternative embodiment of the present invention is illustrated by FIGS. 2, 3 and 4, comprising a hydraulic power unit 100 and a hydraulically operated machine 12, such as that shown in FIG. 1, incorporating a plurality of working cylinders 14 each having a working piston 16 therein, but eliminating oil lines 38 and 40 and the oil return valve 36 (FIG. 4). The power unit 100 comprises four master extensible fluid motors 102, as represented by pneumatic cylinders 102, interconnected at an axially intermediate point by a plate 104. Each cylinder 102 comprises an upper cylindrical retract air power transmitting member or piston 106 and a lower cylindrical advance air power transmitting member or piston 108 each fixedly secured to the plate 104 in a manner that the plate 104 closes off one end of each of the pistons 106 and 108. The four upper pistons 106 are each slidably secured within upper retract air housings 110 which in turn are fixedly connected onto upper plate 112. The four lower pistons 108 are each slidably secured within lower advance air housings 114 which are fixedly connected onto a lower plate 116.

A slave extensible fluid motor 118, as represented by hydraulic slave cylinder 118, having a cylindrical upper advance oil power transmitting member or piston 120 and a lower cylindrical retract oil power transmitting member or piston 122 fixedly secured to the intermediate plate 104 concentrically on opposite sides of the plate, is disposed in a laterally intermediate location of the master extensible fluid motors or pneumatic cylinders 102. Upper piston 120 and lower piston 122 are slidably disposed in cylindrical housings 124 and 126, respectively, in a manner similar to the construction of the cylinders 102. Upper housing 124 is fixedly secured to upper plate 112 at the center of the plate 112 and lower housing 126 is similarly fixedly secured to lower plate 116.

The intermediate plate 104 has guide means comprising eight apertures through the plate 104 through which rods are disposed, four rods 128 located toward the interior of the plate 104 adjacent the hydraulic slave cylinder 118, and four rods 130 disposed at the four corners of the plate 104 exteriorly of the pneumatic master cylinders 102. All eight rods 128 and 130 are utilized to space apart and fixedly tie together upper plate 112 and lower plate 116. The four corner rods 130 also function to guide the intermediate plate 104 in its upward and downward movements during the operation of the hydraulic power unit.

Thus the intermediate plate 104 moves upwardly and downwardly primarily in response to the movement of the four master cylinders 102, guided by the rods 130. The plate 104 then transmits movement to the hydraulic slave cylinder 118, whereby the slave cylinder 118 moves in unison with the master air cylinders 102 disposed around it.

Referring to FIG. 3, the power unit 100 of the present invention further comprises a solenoid operated air supply valve 132, including silencers 133, connected to the pneumatic master cylinders 102 by fluid conduits 134 and 136 and normally spring biased to a first position (as shown) to place the upper pistons 106 of the master cylinders 102 in fluid communication with the atmosphere and the lower pistons 108 of the cylinders 102 in fluid communication with a pressurized source of air (e.g., plant air), and actuatable by the solenoid 135 of the valve 132 to a second position to place the upper pistons 106 of the cylinders 102 in fluid communication with the pressurized source of air and the lower pistons 108 in fluid communication with the atmosphere; and hydraulic slave cylinder 118 being connected via fluid conduits 138 and 139 (via check valve 141) to both a return or retract oil conduit system 140 (communicating with the rod end of each of the working cylinders 14) and to a conduit 142 communicating with a pneumatically-operated hydraulic four-way valve 144, and being connected via fluid conduit 146 to both conduit 148 (via check valve 147), communicating with the hydraulic four-way valve 144 via conduit 150 and to an oil reservoir 152 (vented to atmosphere) via conduit 154, and via fluid conduits 155 and 156 to fluid conduit 158 (via check valve 157), which communciates with both the supply or advance oil conduit system 160 (communicating with the head end of each of the working cylinders 14) and the hydraulic four-way valve 144 as the alternate port to that provided by conduit 142. Disconnects 161 and 162 are included to permit interchangeability between the power unit 100 and various working units as desired.

The alternative embodiment described herein utilizes only one hydraulic four-way valve 144 to control the oil flow throughout the unit 100 instead of the two valves required by the unit of FIG. 1. The oil supply valve 144 is also pneumatically controlled via fluid conduit 163 communicating with conduit 136 to associate the operation of the hydraulic supply valve 144 with the operation of the solenoid operated air supply valve 132. With the air supply valve 132 set (as shown) in the advance position, the hydraulic supply valve 144 is actuated to an advance position (as shown) against the spring bias of its normal (retract) position to communicate fluid conduit 158 with fluid conduit 164 and communicate fluid conduit 142 with fluid conduit 150.

The power unit 100 has unique features of providing intensified return oil to the working cylinders (which becomes important when the pistons 16 are stuck due to bent rods, etc.) and providing a lock-up for retract oil in the return oil conduit system 140 (which is desirable to keep the piston rods from drifting downwardly when the machine element is shut down for a period of time and the cylinders 14 are mounted with the rod ends down). The power unit 100 incorporates two relatively small, short-stroke, single-acting hydraulic cylinders 166 and 168 having the rod end 167, 169 of each respective piston 170 and 172 vented to atmosphere. The cylinders 166 and 168 are fixedly secured to the lower plate 116 with the rod ends 167, 169 of the pistons 170 and 172 directed upwardly toward the intermediate plate 104 so as to be contacted by the plate 104 at a point in the downward travel (retract) of the plate 104, whereby the plate 104 forces the pistons 170 and 172 downwardly through the cylinders 166 and 168 forcing oil into fluid conduit 164 which operably communicates with both of the cylinders 166 and 168. The plate 104 engages the rod ends 167, 169 before the end of the stroke of the cylinders 102 and 118. Thereby, if oil is lost in the return oil conduit system 140, reserve oil exists during the stroke of the cylinders 166 and 168 to refill that return system 140.

Cylinders 166 and 168 are charged with oil from the hydraulic four-way valve 144 during the advanced slave pressurized function of the operation through conduit 164. This same oil is discharged from the cylinders 166 and 168 through conduit 164 in the return slave pressurized function of the cycle greatly intensified through the valve 144 into the return or retract system 140 and thereby into the gun retract manifold. A check valve 141 keeps the intensified oil directed to the return system 140 and nothing further is required to sequence the two cylinders 166 and 168 due to the mechanical design of the unit 100.

The reset sensor 42, 46 of the emdodiment of FIG. 1 has also been eliminated and the cycle time has been shortened with this embodiment by utilizing a large flow control check valve 176 with an oil conduit 178 communicating with the fluid conduit 150 at the discharge side of the supply valve 144 when the valve is in the Retract (normal) position (not shown) and also communicating with the fluid conduit 154 communicating wih the oil reservoir 152. Since the welding guns will be retracted (whether a few or many in number) in a matter of 0.3 to 0.4 of a second, a by-pass flow control 180 can be left partly open (a locked setting), running off some of the pressurized oil from the return slave portion (lower piston 122) during the retracting of the welding guns and complete the Reset part of the cycle by running off the balance of the excess oil (under pressure) through conduits 148 and 146 directly into the advance slave portion (upper piston 120) of the cylinder 118 and/or to the reservoir 152 via conduit 154.

The advance slave portion (upper piston 120) of the cylinder 118 should have an oil volume substantially greater than the total volume of all of the head ends of all of the working cylinders 14 (plus the volume of the relevant conduits and actuators) to make sure that sufficient oil always exists to quickly advance the working pistons when desired and to accommodate all leaks (which are unavoidable). With the unit 100 of FIGS. 2 and 3, the fluid from either side of the gun working cylinders is always discharged through the hydraulic four-way valve 144 directly back into the slave cylinder 118 under pressure along with communicating with conduit 154 (and thereby reservoir 152) to balance out any plus or minus in the actual volume of oil which may have been caused by leaks. The balancing process is also performed faster since the slave cylinder 118 will be refilled by oil under all the back pressure of the guns instead of being refilled solely by drawing oil from the reservoir (at atmospheric pressure).

Intensifying means has also been provided where two-stage power is required, i.e. a high speed, low force advance stroke followed upon workpiece engagement by a low speed, high force working stroke. In the embodiment of FIGS. 2 and 3, an oil over oil intensifier 182 is used. The intensifier 182 has three working chambers 184, 186 and 188 in a dual cylinder 190 and 192 arrangement, the chambers formed by head and rod ends of a double-acting piston 194 having piston heads 196 and 198, one disposed in each cylinder 190 and 192, respectively. The head end of piston head 198 in cylinder 192 forms a working chamber 188 which communicates via conduit 200 with conduit 158 which communicates with both the advance oil conduit system 160 (and the head end of each of the working cylinders) and the hydraulic four-way valve 144 as the alternate port to that provided by conduit 142. The rod end of piston head 196 in cylinder 190 forms a working chamber 186 which communicates via conduit 202 with conduit 139 which, in turn, communicates with both the retract oil conduit system 140 (communicating with the rod end of each of the working cylinders) and to conduit 142 communicating with the other port of the same valve 144 with which conduit 158, and thereby working chamber 188, communicates. The head end of piston head 196 in cylinder 190 forms working chamber 184. Conduit 204 communicates with working chamber 184 and both a sequence valve 206 communicating with the acdvance oil portion 120 of the hydraulic slave cylinder 118 via conduits 208, 155, and 146 and a conduit 203 bypassing the sequence valve 206, including a check valve 205 within the bypass. The sequence valve 206 has a pilot 210 with a fixed orifice selected to sequence the valve 206 in a selected period of time. In the preferred embodiment, all guns whether a few or a large number will advance in approximately 0.3 to 0.4 of a second. Thus, the pilot 210 can be fixed to sequence in 0.5 seconds and always sequence after the guns have advanced. It should be noted also that a similar sequence valve could be utilized as a substitute for flow control 180 for the reset control as described above although the flow control 180 is preferred since it is believed to be simpler mechanism for reset control.

The advance intensifier 182 as described is powered by the use of some of the oil from the advance oil piston 120 of the hydraulic slave cylinder 118 to greatly reduce the size of the intensifier (oil over oil versus air over oil). The intensifier 182 also does not need to have a sensor reading the falling off of back pressure to sequence the intensifier 182 but instead the sequencing can be performed more predictably with the sequencing valve 206.

When it is desired to activate the hydraulic machine 12, electric power is supplied to activate the solenoid 135 of the air supply valve 132 to the position shown in FIG. 3. This initiates the advance portion of the machine cycle. Air under plant pressure is supplied via valve 132 and conduit 136 to both the four lower advance air pistons 108 of the master cylinders 102 and via conduit 163 to activate the hydraulic four-way valve 144 to the position shown. Air is exhausted from the upper pistons 106 of the master cylinders 102 to the atmosphere via conduit 134 and valve 132. Upward movement of the master cylinders 102 causes plate 104 to move slave cylinder 118, which in turn causes oil to be forced out of the advance oil pistion 120 of the slave cylinder 118 into conduits 146, 155 and 156 into the supply or advance oil conduit system 160 to the heads of the working pistons 14 of the guns to cause the working elements thereof to advance toward the workpieces (not shown). Check valve 147 separates the oil under pressure in conduit 146 from entering conduit 148 and passing into the retract oil conduit system 140. The rod ends of the working pistons 14 of the guns are in fluid communication with the retract or return oil conduit system 140 and conduit 138 and oil forced out by the advance stroke flows into conduit 139 to ultimately enter the return oil piston 122 of the slave cylinder 118 via conduit 142, valve 144, and conduits 150, 178 and, via valve 176 and conduit 138 with the option of also returning to the oil reservoir 152 via conduit 154.

In the embodiment as presently represented, after 0.5 seconds into the advance stroke, the guns should be sufficiently advanced for intensification. The pilot 210 of the sequence valve 206 is being bled oil from conduit 155 via conduit 208 until the spring load of the valve is overcome to pass oil into working chamber 184 via conduit 204. The oil forces piston head 196 upwardly to force oil out of working chamber 186 through conduit 202 to conduit 139 into the same options as the oil coming out of the retract oil conduit system 160, i.e. return to the slave cylinder 118 at the return oil piston 122 or into the oil reservoir 152. Piston head 198 is also forced upwardly to force oil out of working chamber 188 into the advance oil conduit system 160, via conduits 200 and 158, to intensify the advanced working elements, generating high forces between the working elements and the workpieces. The apparatus remains in this intensifying condition until the solenoid operated air supply valve 132 is energized to the retract position.

Energization of valve 132 to the retract position initiates the retract portion of the machine cycle, which causes the system to move out of the condition illustrated in the drawing. During the retract portion of the cycle, air under pressure is supplied by air supply valve 132 to the four upper retract air pistons 106 of the master cylinders 102 via conduit 134. Conduit 136 is vented to the atmosphere by the valve 132 in this retract position exhausting both the four lower pistons 108 of the master cylinders 102 and conduit 163, which in turn cause the spring loaded hydraulic valve 144 to move to the retract position (not shown). The plate 104 is moved downwardly due to the air pressure in upper pistons 106 to generate oil pressure in the lower retract piston 122 of the slave cylinder 118, forcing oil into the retract oil conduit system 140 via conduits 138 and 139 to supply pressurized oil at the rod ends of the working pistons 16, causing them to retract. That same oil resets the advance intensifier 182, flowing into working chamber 186 from conduit 139 via conduit 202.

The retraction of the working pistons forces oil out of the advance oil conduit system 160 to assist in returning the position of the advance intensifier 182 back to normal (not shown) via conduits 158 and 200 into working chamber 188 and also return oil via conduit 158 and valve 144 to the advance piston 120 of the slave cylinder 118 via conduits 150, 148 and 146 or to the reservoir 152 via conduits 150 and 154. Then the Reset feature and the Retract intensifier will come into operation as described above to complete the cycle and then maintain the position of the working pistons until the air supply valve 132 is energized into the Advance position to begin a new cycle.

It should be noted that if a low viscosity mixed fluid, such as a 95-5 water-synthetic fluid is desired to be used instead of oil, it may be preferable to substitute three air pilot operated check valves for the four-way valve 144 to prevent bypass of the low viscosity oil through the valve 144. Two of the pilot operated check valves would directly replace the four-way valve 144 and the third would be attached to a bypass conduit to refill the retract intensifier cylinders 166 and 168.

Figure 5:
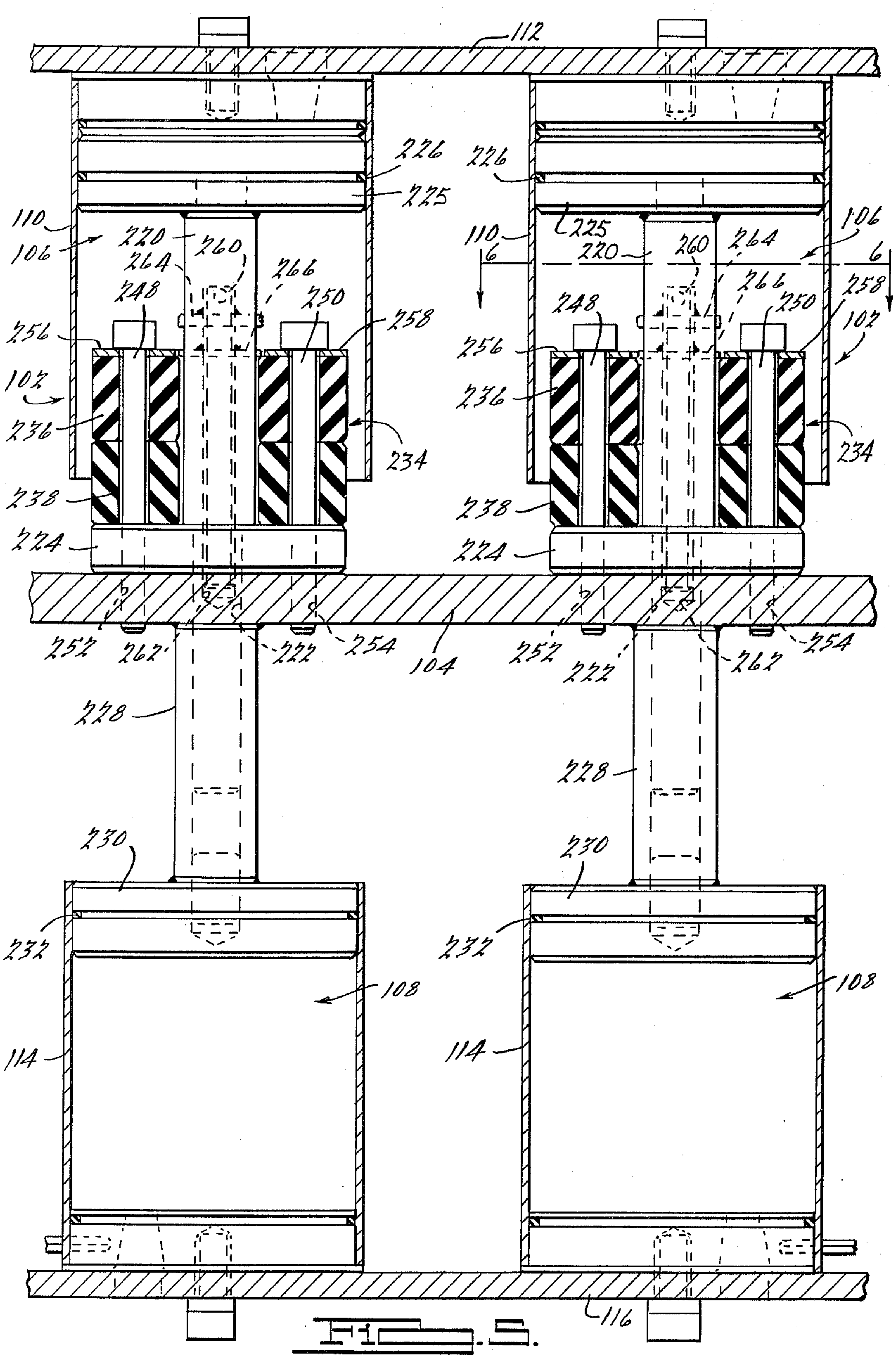
FIG. 5 is a vertical sectional view taken along line 5—5 of FIG. 2.

As illustrated in FIG. 5, upper piston 106 of master extensible fluid motor or air cylinder 102 comprises a rod 220 that is disposed through an aperture 222 in plate 104 and welded to an annular ring 224 at an intermediate point on the rod 220. At the upper extreme of the rod 220 is welded a piston head 225. Piston head 224 is operably disposed in housing 110 to form the upper cylindrical retract air piston 106. Piston head 225 has a suitable sealing ring 226 associated therewith.

Below the plate 104 a second rod 228 is fixedly attached to the plate 104 and a second piston head 230 is welded to the opposite end of the sleeve 228. Piston head 230 is operably disposed in housing 114 to form lower cylindrical advance air piston 108. Piston head 230 also has a suitable sealing ring 232 associated therewith.

Figure 6:
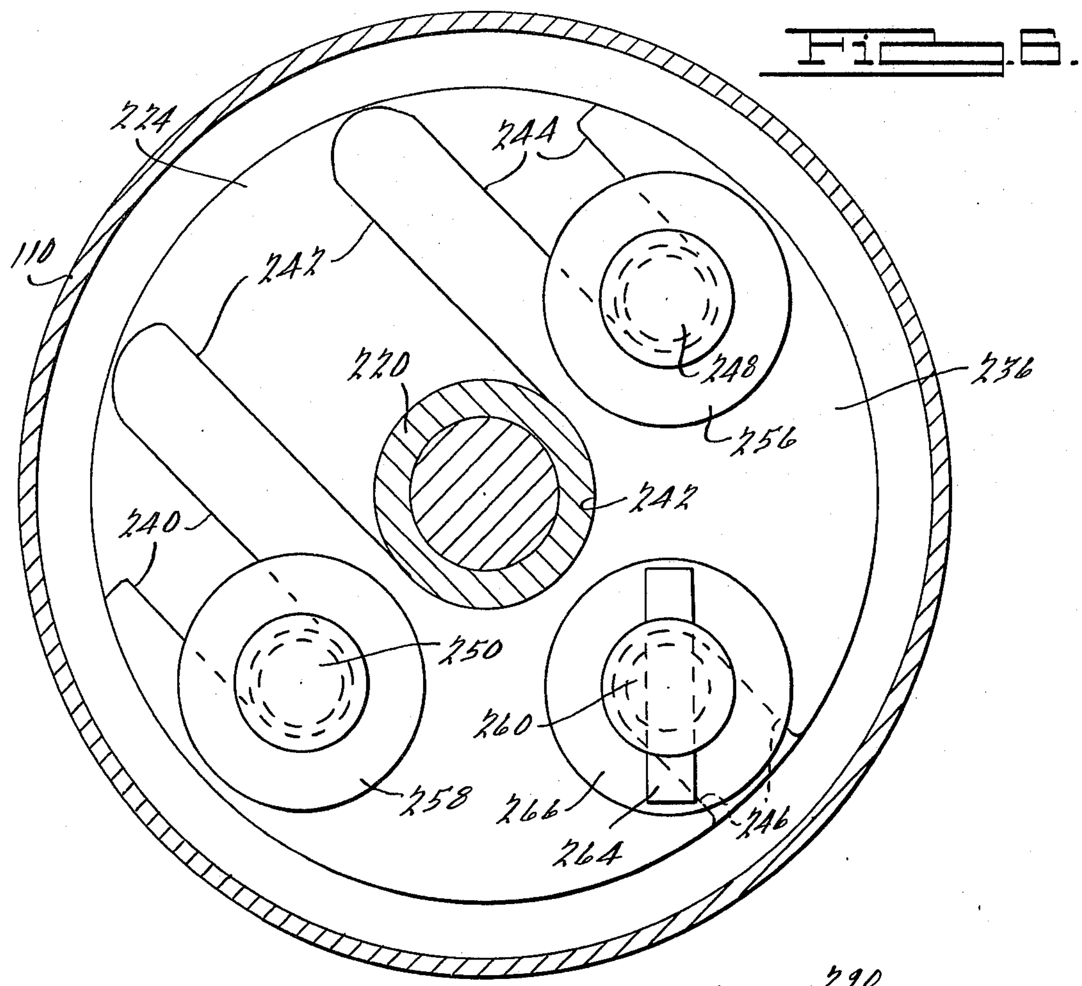
FIG. 6 is a horizontal sectional view of a spacer assembly taken along the line 6—6 of FIG. 5.

The annular ring 224 of the upper piston 106 is secured to the plate 104 via a spacer assembly 234 for adjusting the volume of the piston 106. If fewer guns are used in some instances, a large cost savings in pressurized air can be made if the volume of the master air cylinders 102 can be easily decreased. The spacer assembly 234 of FIGS. 5 and 6 accomplishes this advantage in a simple, efficient manner. Spacers 236 and 238, having a configuration as shown in FIG. 6, are stacked on top of the annular ring 224. The spacers 236, 238 each have four slots 240, 242, 244 and 246. The middle slot 242 engages rod 220. Bolts 248 and 250 are engaged by slots 240 and 244 respectively before the bolts 248, 250 pass through the annular ring 224 and threadably engage the plate 104 at threaded holes 252 and 254. Washers 256 and 258 are used to provide a wider and more even interface between the bolts 248, 250 and the top spacer 236. Threaded rod 260 engages the posterior slot 246 and threadably engages the plate 104 at bore 262 after passing through the annular ring 224. The rod 260 is rotated by movement of crossmember 264 welded thereto. A washer 266 is also welded to the rod 260 to provide a lateral locking interface with the top spacer 236.

Threaded restraining rod 260 is utilized to restrain the movement of the spacers 236, 238 and secure them in position. Bolts 248 and 250 and rod 220 align the spacers 236, 238 in their operative position. Volume of the piston 106 is diminished by placement of one or both of the spacers 236, 238 below the annular ring. Restraining rod 260 is removed, one or both spacers 236, 238 are slidably removed, annular ring 224 is moved upwardly, one or more spacers 236, 238 are placed between the ring 224 and the plate 104, and the retraining rod 260 is replaced to resecure the assembly 234 together. In this manner, the volume of the piston 106 is diminished by the height of the spacer or spacer positioned below the ring 224 times the cross-sectional area of the bore of the piston 106.

Figure 7:
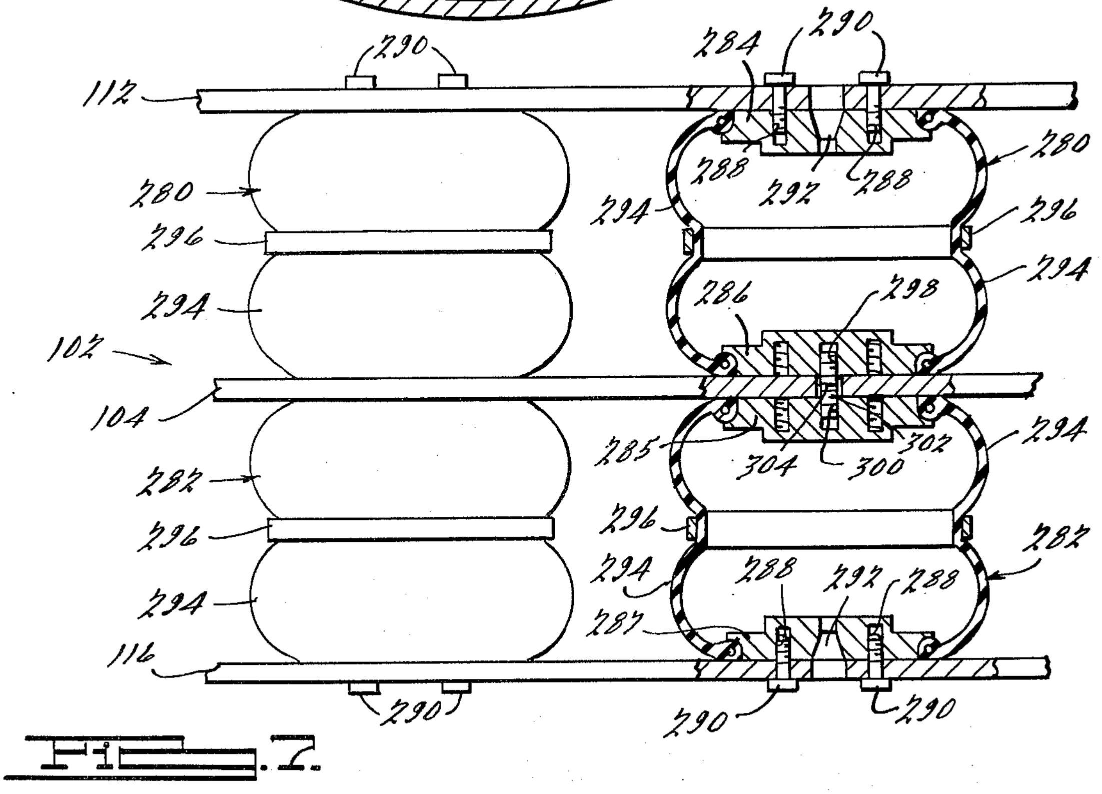
FIG. 7 is a side view similar to FIG. 5 of an alternate embodiment of the master cylinders of the present invention with portions of the unit in elevation.

FIG. 7 illustrates another construction of the master cylinders 102 of the unit 10. Air bags 280, 282 of the type manufactured by the Goodyear Tire and Rubber Company, Industrial Products Division, Akron, Ohio are used as a less expensive alternative to the pistons 106 and 108 of the extensible fluid motors 102 of the unit 10. Illustrated in FIG. 7 are Goodyear 2B Double Convolute-Bellows Type air bags comprising metal upper 284, 285 and lower 286, 287 power transmitting or retainer members, including blind taps 288 for bolts 290 attaching the air bags 280 and 282 to the plates 104, 112 and 116, an air hose fitting 292, a flex member 294, a girdle ring 296 around the intermediate point of the flex member 294, and taps 298, 300 threadably engageable with rod 302 at each end thereof respectively, the rod 302 passing through bore 304 in plate 104 whereby the air bags 280 and 282 are secured to the plate 104 in assembly with the rod 302. The volume of air needed to actuate the air bags 280 and thereby the unit 10 may be diminished if the full capacity of the air bags 280 is not needed (such as with a less than maximum number of working pistons in a desired usage situation) by filling the air bags partially with water or an antifreeze solution. The embodiment illustrated in FIG. 7 may also be utilized in association with the various intensifier cylinders in the manner described above as utilized with the pneumatic piston extensible fluid motors 106 and 108 as illustrated by FIGS. 2 through 6.

Thus, there is disclosed in the above description and in the drawings an improved hydraulic power unit which fully and effectively accomplishes the objectives thereof.

The dimensions and sequence times set forth in the above specification are merely representative and are not meant to be limiting on the scope of the invention.

It will be apparent that variations and modifications of the disclosed embodiments may be made without departing from the principles of the invention or the scope of the appended claims.

I claim:

1. An air operated demand only hydraulic power unit for supplying hydraulic fluid under pressure to one or more hydraulic working cylinders, each having a working piston thereof, comprising:

a pneumatic first extensible fluid motor means having a first power transmitting means therein;

a solenoid operated air supply valve actuatable to a first position to place one side of said first power transmitting means in fluid communication with a pressurized source of air and the opposite side thereof in fluid communication with atmosphere, and to a second position to place said one side of said first power transmitting means in fluid communication with atmosphere and said opposite side in fluid communication with a pressurized source of air;

a hydraulic second slave extensible fluid motor means having a second power transmitting means therein, said second power transmitting means being operatively connected to and powered by said first power transmitting means;

said second extensible fluid motor means being connected via an advance oil conduit and a retract oil conduit to each said working cylinder so that movement of said second power transmitting means in a first direction will cause oil to be pumped out of said second extensible fluid motor means through said advance conduit to advance each said working piston, and movement of said second power transmitting means in the opposite direction will cause oil to flow through said retract conduit to retract each said working piston;

an oil supply valve actuatable by said solenoid operated air supply valve to a first position when said air supply valve is in said first position to place one side of said second power transmitting means in fluid communication with an oil reservoir and to block fluid communication between the opposite side thereof and said reservoir, and to a second position to block fluid communication between said one side of said second power transmitting means and said reservoir;

reset means for insuring full cycling of said second power transmitting means in said second extensible fluid motor, said reset means disposed between said advance oil conduit and said retract oil conduit, comprising a flow control check valve and a bypass flow control around said check valve, said check valve being closed when oil in said retract oil conduit is at a higher pressure than oil in said advance oil conduit, said bypass flow control being operable to feed oil to said advance oil conduit from said retract oil conduit when said check valve is in a closed position;

an advance intensifier comprising a first oil cylinder having a first piston therein and a second oil cylinder having an intensifying piston therein powered by said first oil cylinder piston, said second oil cylinder being in fluid communication with said advance oil conduit and one end of said first piston being in fluid communication with said retract oil conduit;

a two-position sequencing valve for controlling said intensifier, said sequencing valve being operable in its second position to place the other end of said first piston in fluid communication with said hydraulic second slave extensible fluid motor means and in its first position to block fluid communication between said other end of said first piston and said hydraulic second slave extensible fluid motor means; and a retract intensifier, comprising hydraulic cylinder means communicating with said retract oil conduit, having piston means and means for coupling the movement of said hydraulic second slave extensible fluid motor means with said piston means in the retract stroke of said hydraulic second slave extensible fluid motor means.

2. The hydraulic power unit of claim 1, wherein said hydraulic second slave extensible fluid motor means comprises hydraulic cylinder means including piston means.

3. The hydraulic power unit of claim 2, wherein said pneumatic first power extensible fluid motor means comprises a plurality of pneumatic cylinders and means for interconnecting the movement of said pneumatic cylinders.

4. The hydraulic power unit of claim 3, wherein said means for interconnecting includes means for powering said hydraulic second slave cylinder means.

5. The hydraulic power unit of claim 4, wherein said means for interconnecting comprises a plate extending between said plurality of pneumatic cylinders and connected to said hydraulic second slave cylinder means.

6. The hydraulic power unit of claim 1, wherein said first pneumatic power extensible fluid motor means has a stroke and said power unit further comprises means for limiting said stroke as selectively desired.

7. The hydraulic power unit of claim 6, wherein said first pneumatic power extensible fluid motor means comprises air bag means and said power unit further comprises means for limiting the stroke comprising means for injecting liquid into said air bags.

8. The hydraulic power unit of claim 6, wherein said first pneumatic power extensible fluid motor means comprises pneumatic cylinder means, and said means for limiting the working volume comprises a spacer assembly cooperably attached to said pneumatic cylinder means.

9. The hydraulic power unit of claim 1, wherein said first pneumatic power extensible fluid motor means comprises air bag means.

10. The hydraulic power unit of claim 1, wherein said first pneumatic power extensible fluid motor means comprises pneumatic cylinder means.

* * * * *